(12) United States Patent
Hijikata et al.

(10) Patent No.: US 10,907,666 B2
(45) Date of Patent: Feb. 2, 2021

(54) HYDRAULIC DRIVE SYSTEM

(71) Applicant: Hitachi Construction Machinery Co., Ltd., Tokyo (JP)

(72) Inventors: Seiji Hijikata, Tsukaba (JP); Yasutaka Tsuruga, Ryugasaki (JP); Kenji Hiraku, Kasumigaura (JP); Kouji Ishikawa, Kasumigaura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 410 days.

(21) Appl. No.: 15/755,342

(22) PCT Filed: Sep. 29, 2016

(86) PCT No.: PCT/JP2016/078949
§ 371 (c)(1),
(2) Date: Feb. 26, 2018

(87) PCT Pub. No.: WO2018/061165
PCT Pub. Date: Apr. 5, 2018

(65) Prior Publication Data
US 2020/0232488 A1    Jul. 23, 2020

(51) Int. Cl.
*F15B 21/14* (2006.01)
*F15B 1/02* (2006.01)
*A01B 63/10* (2006.01)

(52) U.S. Cl.
CPC .............. *F15B 21/14* (2013.01); *F15B 1/024* (2013.01); *A01B 63/10* (2013.01)

(58) Field of Classification Search
CPC .... F15B 21/14; F15B 1/024; F15B 2211/212; F15B 2211/31547; F15B 2211/20576; F15B 2211/3056; F15B 2211/3059
See application file for complete search history.

(56) References Cited

U.S. PATENT DOCUMENTS

| | | | | |
|---|---|---|---|---|
| 4,369,625 A | * | 1/1983 | Izumi | E02F 9/2292 414/699 |
| 5,277,027 A | * | 1/1994 | Aoyagi | E02F 9/2232 60/420 |

(Continued)

FOREIGN PATENT DOCUMENTS

| | | |
|---|---|---|
| CN | 202081450 U | * 12/2011 |
| CN | 102575690 A | 7/2012 |

(Continued)

OTHER PUBLICATIONS

International Preliminary Report on Patentability (PCT/IB/338 & PCT/IB/373) issued in PCT Application No. PCT/JP2016/078949 dated Apr. 11, 2019, including English translation of document C2 (Japanese-language Written Opinion (PCT/ISA/237) previously filed on Feb. 26, 2018) (nine (9) pages).

(Continued)

*Primary Examiner* — Thomas E Lazo
(74) *Attorney, Agent, or Firm* — Crowell & Moring LLP

(57) ABSTRACT

It is an object of the present invention to provide a hydraulic drive system that effectively utilizes a hydraulic fluid accumulated in an accumulator to make it possible to achieve a substantial improvement in terms of efficiency for a work machine as a whole. A hydraulic drive system includes: a first hydraulic pump; a first hydraulic actuator driven by being supplied with a hydraulic fluid from the first hydraulic pump; a first line for supplying the hydraulic fluid from the first hydraulic pump to the first hydraulic actuator; a first pump flow adjustment device installed in the first line, the first pump flow adjustment device being configured to adjust; a first hydraulic accumulator for accumulating the hydraulic fluid delivered from the first hydraulic pump; and a first accumulation flow adjustment device configured to adjust the flow of the hydraulic fluid from the first hydraulic pump to the first hydraulic accumulator. The hydraulic drive (Continued)

system further comprises a first accumulation flow supply device configured to supply the hydraulic fluid accumulated in the first hydraulic accumulator to the first hydraulic actuator via a second line different from the first line.

10 Claims, 9 Drawing Sheets

(56) References Cited

U.S. PATENT DOCUMENTS

| | | | | |
|---|---|---|---|---|
| 5,996,341 | A * | 12/1999 | Tohji | E02F 9/2203 60/421 |
| 7,614,335 | B2 * | 11/2009 | Gradea | E02F 9/2203 60/420 |
| 9,051,712 | B2 * | 6/2015 | Kodaka | E02F 3/962 |
| 2012/0198831 | A1 | 8/2012 | Kodaka et al. | |
| 2013/0081704 | A1 | 4/2013 | Opdenbosch | |
| 2013/0318955 | A1 * | 12/2013 | Zhang | E02F 9/2296 60/413 |
| 2016/0245311 | A1 | 8/2016 | Kajita et al. | |

FOREIGN PATENT DOCUMENTS

| | | |
|---|---|---|
| CN | 102635142 A | 8/2012 |
| JP | 6-159312 A | 6/1994 |
| JP | 2009-275773 A | 11/2009 |
| JP | 2010-25200 A | 2/2010 |
| JP | 2012-197823 A | 10/2012 |
| JP | 2014-206253 A | 10/2014 |
| JP | 2014206253 A * | 10/2014 |
| JP | 2015-172396 A | 10/2015 |

OTHER PUBLICATIONS

Chinese-language Office Action issued in counterpart Chinese Application No. 201680049445.6 dated May 5, 2019 (nine (9) pages).
Japanese-language International Search Report (PCT/ISA/210) issued in PCT Application No. PCT/JP2016/078949 dated Dec. 20, 2016 (Two (2) pages).
Japanese-language Written Opinion (PCT/ISA/237) issued in PCT Application No. PCT/JP2016/078949 dated Dec. 20, 2016 (Five (5) pages).
English translation of document C1 (Japanese-language International Search Report (PCT/ISA/210) issued in PCT Application No. PCT/JP2016/078949 dated Dec. 20, 2016) previously filed on Feb. 26, 2018 (one page).
Extended European Search Report issued in European Application No. 16913638.9 dated Mar. 18, 2020 (three (3) pages).

* cited by examiner

FIG. 3

| No | OPERATION | PUMP/ACC CONNECTION DESTINATION |||
|---|---|---|---|---|
| | | PUMP 1 | PUMP 2 | ACC1 |
| 1 | SINGLE BOOM | ②BM | ③BM | ①BM |
| 2 | SINGLE ARM | ③AM | ②AM | ①AM |
| 3 | SINGLE BUCKET | ②BK | ACC | ①BK |
| 4 | SINGE SWING | ACC | ②SW | ①SW |
| 5 | EXCAVATION | BK | AM | BM |
| 6 | SWING BOOM RAISING | BM | SW | BM |
| 7 | SWING BOOM RETURNING | BK / BM | SW | AM |

FIG. 9

| No | OPERATION | PUMP/ACC CONNECTION DESTINATION | | | |
|---|---|---|---|---|---|
| | | PUMP 1 | PUMP 2 | ACC1(HP) | ACC2(MP) |
| 1 | SINGLE BOOM | ②BM | ③BM | ①BM | |
| 2 | SINGLE ARM | ③AM | ②AM | | ①AM |
| 3 | SINGLE BUCKET | ②BK | ACC1or2 | | ①BK |
| 4 | SINGE SWING | ACC1or2 | ②SW | ①SW | |
| 5 | EXCAVATION | BK | AM | BM | |
| 6 | SWING BOOM RAISING | BM | SW | BM | |
| 7 | SWING BOOM RETURNING | BK | SW | AM | BM |

HYDRAULIC DRIVE SYSTEM

TECHNICAL FIELD

The present invention relates to a hydraulic drive system and, more specifically, to a hydraulic drive system of a work machine equipped with an actuator such as a hydraulic excavator.

BACKGROUND ART

In connection with a work machine equipped with a hydraulic pump, an accumulator accumulating a hydraulic fluid delivered from the hydraulic pump, and an actuator operated by the hydraulic fluid from the hydraulic pump and/or the accumulator, there is known a technique in which part of the hydraulic fluid delivered from the hydraulic pump is accumulated in the accumulator in the case where the requisite power for the driving of the actuator is small, and the hydraulic fluid accumulated in the accumulator is supplied to the actuator in the case where the requisite force for driving the actuator is large, thereby mitigating the loss of the hydraulic pump.

For example, there is a snow shovel equipped with a hydraulic apparatus in which even in the case where the engine speed is reduced in order to suppress the traveling speed, a hydraulic cylinder (actuator) is driven by the hydraulic fluid accumulated in the accumulator in order to increase the drive speed of the hydraulic cylinder (actuator) and in the case where the pressure in the accumulator is equal to or greater than a predetermined value, the hydraulic pump is unloaded to suppress unnecessary output power of the hydraulic pump (see, for example, Patent Document 1).

Further, there is a configuration which is equipped with an accumulator accumulating the hydraulic fluid delivered from the hydraulic pump in order to improve the operational efficiency of the accumulator and in which the hydraulic fluid from the accumulator is sent to the suction side of a dedicated pump motor coaxially connected to the engine to drive the hydraulic cylinder (actuator). In this configuration, the hydraulic fluid is accumulated in the accumulator when the load of the engine is low, and the hydraulic fluid is discharged from the accumulator for assistance when the load of the engine is high, whereby it is possible to attain leveling of the engine load and to achieve a reduction in the engine size (see, for example, Patent Document 2).

PRIOR ART DOCUMENTS

Patent Documents

Patent Document 1: JP-2010-025200-A
Patent Document 2: JP-2009-275773-A

SUMMARY OF THE INVENTION

Problem to be Solved by the Invention

In the technique of Patent Document 1 described above, even in the case where the hydraulic cylinder is operated while increasing the traveling speed, the hydraulic fluid delivered from the hydraulic pump is temporarily accumulated in the accumulator. As a result, there is generated a surplus pressure loss for charging the accumulator and energy loss due to the leakage of the accumulator. Thus, in the case where the hydraulic cylinder is operated while increasing the traveling speed, there is a fear of the efficiency being deteriorated as compared with the configuration in which the hydraulic fluid is supplied directly to the hydraulic cylinder from the hydraulic pump.

In the technique of Patent Document 2 described above, the dedicated pump motor is coaxially connected to the engine, so that the drag loss increases. Further, the hydraulic fluid accumulated in the accumulator is discharged via the dedicated pump motor without fail, so that there is generated a loss in mechanical efficiency and volume efficiency. Thus, there is a fear of the hydraulic fluid accumulated in the accumulator being effectively utilized.

The present invention has been made in view of the above circumstances. It is an object of the present invention to provide a hydraulic drive system that effectively utilizes the hydraulic fluid accumulated in the accumulator to make it possible to achieve a substantial improvement in terms of efficiency for the work machine as a whole.

Means for Solving the Problem

To achieve the above object, there is adopted, for example, the configuration as claimed in the appended claims. The present application includes a plurality of means for achieving the above object, an example of which includes a hydraulic drive system including: a first hydraulic pump; a first hydraulic actuator driven by being supplied with a hydraulic fluid from the first hydraulic pump; a first line for supplying the hydraulic fluid from the first hydraulic pump to the first hydraulic actuator; a first pump flow adjustment device installed in the first line, the first pump flow adjustment device being configured to adjust; a first hydraulic accumulator for accumulating the hydraulic fluid delivered from the first hydraulic pump; and a first accumulation flow adjustment device configured to adjust the flow of the hydraulic fluid from the first hydraulic pump to the first hydraulic accumulator. the hydraulic drive system further comprises a first accumulation flow supply device configured to supply the hydraulic fluid accumulated in the first hydraulic accumulator to the first hydraulic actuator via a second line different from the first line.

Effect of the Invention

According to the present invention, there are provided one circuit supplying the hydraulic fluid directly to the hydraulic cylinder from the hydraulic pump via one valve, and another circuit supplying the hydraulic fluid accumulated in the accumulator to the hydraulic cylinder via another valve, and it is possible to supply the hydraulic fluid to the hydraulic cylinder from more efficient one of the circuits in accordance with the operation, so that it is possible to achieve a substantial improvement in terms of efficiency for the work machine as a whole and to achieve a large fuel reduction.

BRIEF DESCRIPTION OF THE DRAWINGS

FIG. 3 is a table chart illustrating the connection relationship between each actuator, a hydraulic pump, and an accumulator for each operation mode of a work machine in the hydraulic drive system according to the first embodiment of the present invention.

FIG. 9 is a table chart illustrating the connection relationship between each actuator, a hydraulic pump, and an accumulator for each operation mode of a work machine in the hydraulic drive system according to the second embodiment of the present invention.

MODES FOR CARRYING OUT THE INVENTION

In the following, embodiments of the hydraulic drive system of the present invention will be described with reference to the drawings.

Embodiment 1

Figure 1:
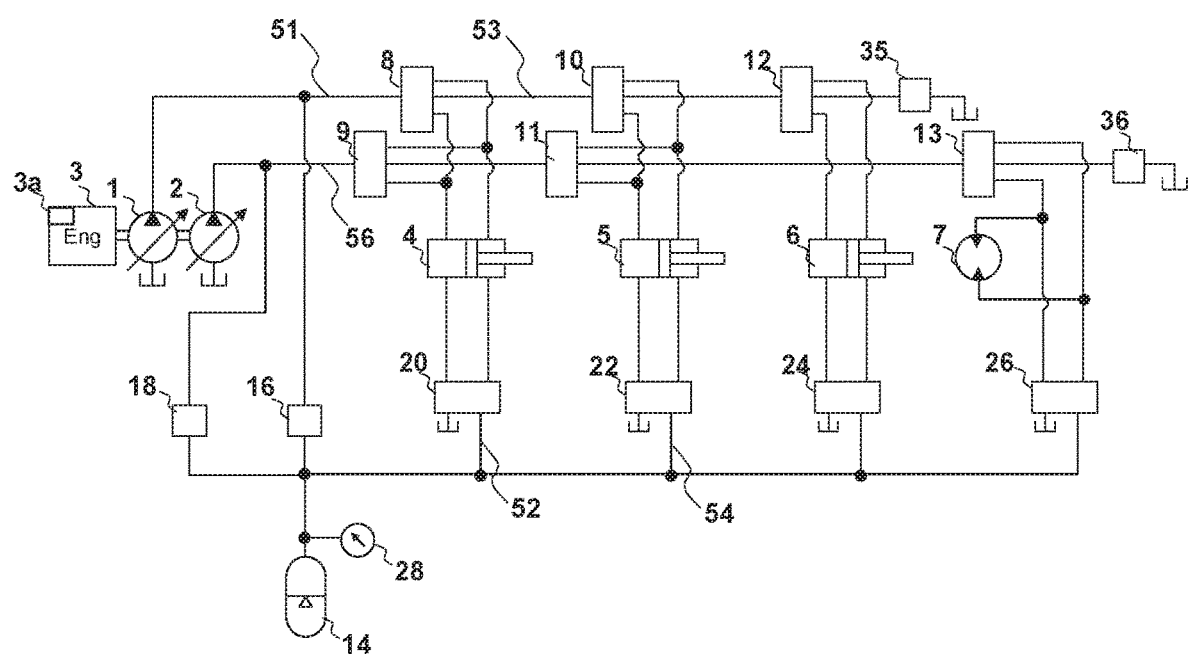
FIG. 1 is a conceptual drawing illustrating a hydraulic circuit in a hydraulic drive system according to a first embodiment of the present invention.

FIG. 1 is a conceptual drawing illustrating a hydraulic circuit in a hydraulic drive system according to the first embodiment of the present invention. More specifically, the drawing illustrates a hydraulic drive system mounted in a hydraulic excavator as the work machine. The hydraulic drive system is equipped with a first hydraulic pump 1 and a second hydraulic pump 2 mechanically connected to an engine 3 and driven by the power of the engine 3, a boom cylinder 4, an arm cylinder 5, a bucket cylinder 6, and a swing motor 7 which are actuators driven by the hydraulic fluid delivered from the hydraulic pumps 1 and 2, and a first accumulator 14 which accumulate the hydraulic fluid of the first hydraulic pump 1 and the second hydraulic pump 2. The engine 3 is equipped with an engine control unit 3a, and the engine control unit 3a receives a command from a controller described below to adjust the engine speed.

The first hydraulic pump 1 and the second hydraulic pump 2 and the actuators are respectively connected together via lines. A line 51 as the first line connecting the first hydraulic pump 1 and the boom cylinder 4 as the first hydraulic actuator is provided with a flow control valve 8 for the first hydraulic pump 1 and the boom cylinder 4 as the first pump flow adjustment device configured to control the flow rate of the hydraulic fluid to be supplied from the first hydraulic pump 1 to the boom cylinder 4. A line 56 as the sixth line connecting the second hydraulic pump 2 and the boom cylinder 4 is provided with a flow control valve 9 for the second hydraulic pump 2 and the boom cylinder 4 as the third pump flow adjustment device configured to control the flow rate of the hydraulic fluid to be supplied from the second hydraulic pump 2 to the boom cylinder 4.

Similarly, a line 53 as the third line connecting the first hydraulic pump 1 and the arm cylinder 5 is provided with a flow control valve 10 for the first hydraulic pump 1 and the arm cylinder 5 as the second pump flow adjustment device configured to control the flow rate of the hydraulic fluid supplied from the first hydraulic pump 1 to the arm cylinder 5. A line connecting the second hydraulic pump 2 and the arm cylinder 5 is provided with a flow control valve 11 for the second hydraulic pump 2 and the arm cylinder 5.

Further, a line connecting the first hydraulic pump 1 and the bucket cylinder 6 is provided with a flow control valve 12 for the first hydraulic pump 1 and the bucket cylinder 6 that is configured to control the flow rate of the hydraulic fluid to be supplied from the first hydraulic pump 1 to the bucket cylinder 6. A line connecting the second hydraulic pump 2 and the swing motor 7 is provided with a flow control valve 13 for the second hydraulic pump 2 and the swing motor 7 that is configured to control the flow rate of the hydraulic fluid to be supplied from the second hydraulic pump 2 to the swing motor 7.

The flow control valves 8 through 13 are center bypass type control valves that discharges the hydraulic fluid from the hydraulic pumps to the tank at a neutral position. Further, a line through which the hydraulic fluid is discharged to the tank via the flow control valves from the first hydraulic pump 1 is provided with a first pump flow cut control valve 35 as a pump flow cut device configured to interrupt the inflow of the hydraulic fluid into the tank. Similarly, is provided with a second pump flow cut control valve 36.

The first and the second hydraulic pump 1, 2 and the first accumulator 14 are connected together via lines. The line connecting the first hydraulic pump 1 and the first accumulator 14 is provided with a flow control valve 16 for the first hydraulic pump 1 and the first accumulator 14 as the first accumulation flow adjustment device configured to control the flow rate of the hydraulic fluid to be supplied from the first hydraulic pump 1 to the first accumulator 14. The line connecting the second hydraulic pump 2 and the first accumulator 14 is provided with a flow control valve 18 for the second hydraulic pump 2 and the first accumulator 14 as the third accumulation flow adjustment device configured to control the flow rate of the hydraulic fluid to be supplied from the second hydraulic pump 2 to the first accumulator 14.

Further, the first accumulator 14 and the actuators are respectively connected together via lines. A line 52 as the second line connecting the first accumulator 14 and the boom cylinder 4 is provided with a flow control valve 20 for the first accumulator 14 and the boom cylinder 4 as the first accumulation flow supply device configured to control the flow rate of the hydraulic fluid to be supplied from the first accumulator 14 to the boom cylinder 4. A line 54 as the fourth line connecting the first accumulator 14 and the arm cylinder 5 is provided with a flow control valve 22 for the first accumulator 14 and the arm cylinder 5 as the second accumulation flow supply device configured to control the flow rate of the hydraulic fluid to be supplied from the first accumulator 14 to the arm cylinder 5.

Similarly, a line connecting the first accumulator 14 and the bucket cylinder 6 is provided with a flow control valve 24 for the first accumulator 14 and the bucket cylinder 6 which is configured to control the flow rate of the hydraulic fluid to be supplied from the first accumulator 14 to the bucket cylinder 6. A line connecting the first accumulator 14 and the swing motor 7 is provided with a flow control valve 26 for the first accumulator 14 and the swing motor 7 which is configured to control the flow rate of the hydraulic fluid to be supplied from the first accumulator 14 to the swing motor 7.

Further, in a line to which the hydraulic fluid is delivered from the first accumulator 14, there is provided a first pressure sensor 28 configured to detect the pressure of the first accumulator 14. The control valves 8 through 13, 16, 18, 20, 22, 24, 26, 35, and 36 described above are driven by a command signal from a controller described below, and controls the flow rate, etc. through a change in the position of a spool inside.

In the present embodiment, a feature of the configuration is that the flow control valves are respectively arranged in the line through which the hydraulic fluid is supplied from the first hydraulic pump 1 to each actuator, the line through which the hydraulic fluid is supplied from the second hydraulic pump 2, and the line through which the hydraulic fluid is supplied from the first accumulator 14.

Figure 2:
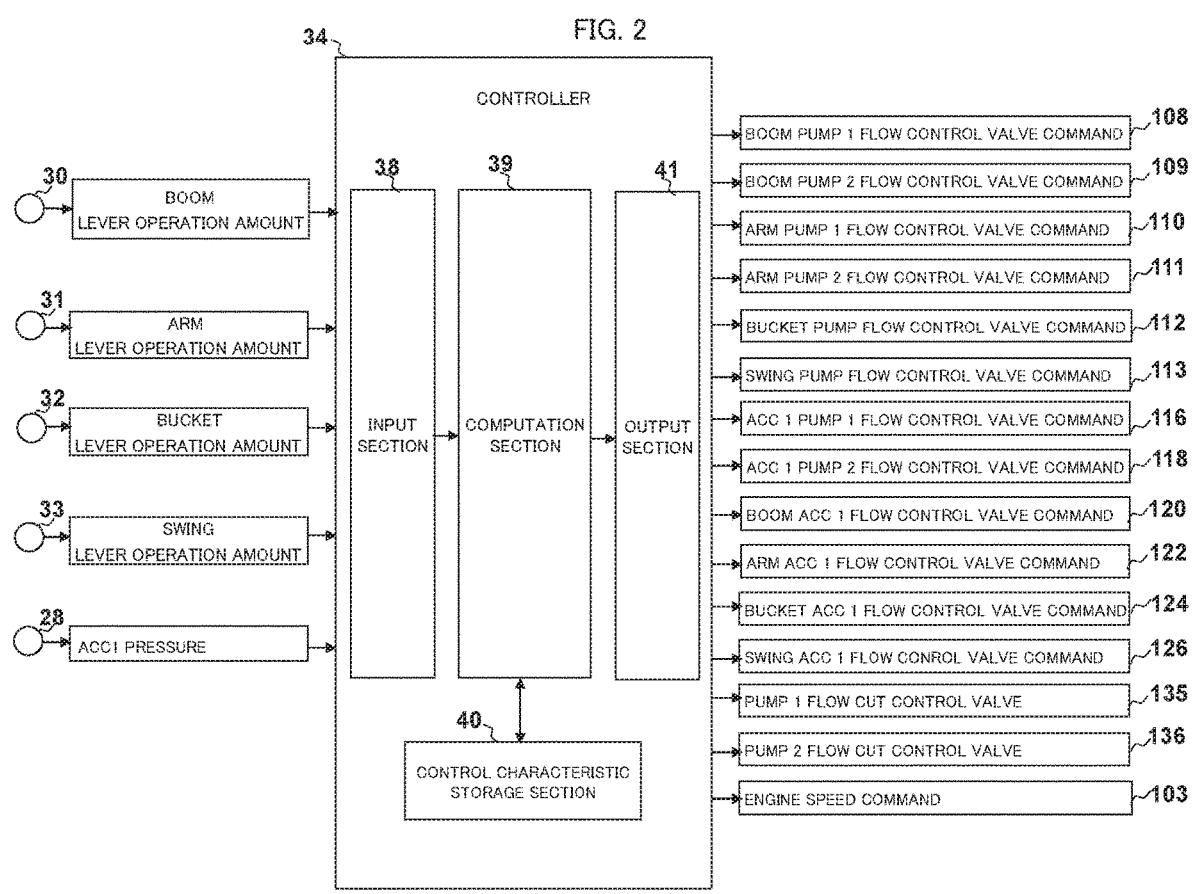
FIG. 2 is a conceptual drawing illustrating an outline of a controller constituting the hydraulic drive system according to the first embodiment of the present invention.

Next, the controller for controlling each flow control valve will be described with reference to FIG. 2. FIG. 2 is a conceptual drawing illustrating an outline of the controller constituting the hydraulic drive system according to the first embodiment of the present invention.

The controller 34 according to the present embodiment is equipped with an input section 38, a computation section 39, a control characteristic storage section 40, and an output section 41.

Figure 4:
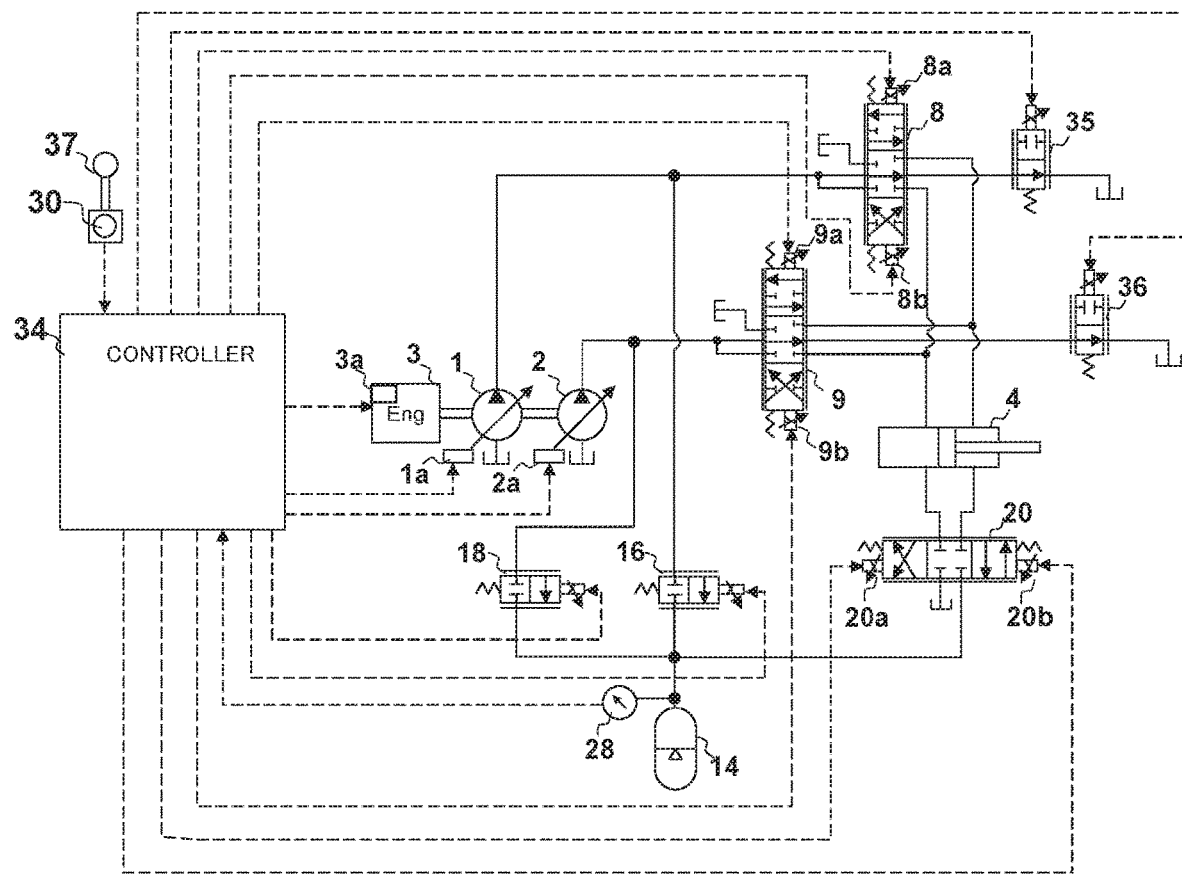
FIG. 4 is a hydraulic circuit diagram illustrating in detail the components of a hydraulic circuit related to a boom of the hydraulic drive system according to the first embodiment of the present invention.

Input to the input section 38 are operation amount signals from lever operation amount sensors for detecting the respective lever operation amounts of a plurality of operation devices (of which solely a boom operation device 37 is shown in FIG. 4) directing the operation of the corresponding actuators, i.e., the operation amount signals of the lever operations detected by a boom lever operation amount sensor 30 as the first operation amount sensor, an arm lever operation amount sensor 31 as the second operation amount sensor, a bucket lever operation amount sensor 32, and a swing lever operation amount sensor 33. Further, there is input a pressure signal of the first accumulator 14 detected by the first pressure sensor 28.

The lever operation amount sensors 30 through 33 are devices for detecting the respective lever operation amounts of the operation devices. Actually, there may be provided an electric signal sensor of an electric lever, or a pressure sensor in the case of a hydraulic pilot type system. Electric signals detected by these sensors are input to the input section 38. The input section 38 converts these electric signals to physical operation amounts and pressure values. The converted signal values are sent to the computation section 39.

As described below, the computation section 39 and the control characteristic storage section 40 distinguish the operation (e.g., single swing operation or excavating operation) to be performed by the work machine based on the input operation amount signal, and determines an optimum hydraulic system for each distinguished operation. Then, the output section 41 outputs a control signal to each apparatus such that the determined hydraulic system is attained. Here, the optimum hydraulic system is formed through the control of the respective flow control valves such that the actuator to which each of the first hydraulic pump 1, the second hydraulic pump 2, and the first accumulator 14 supplies the hydraulic fluid is the one previously set in accordance with the operation.

The output section 41 outputs control valve commands 108 through 113, 116, 118, 120, 122, 124, 126, 135, and 136 for controlling the respective flow control valves 8 through 13, 16, 18, 20, 22, 24, 26, 35, and 36. Further, in order to adjust the engine speed, it outputs an engine speed command 103 to the engine control unit 3a of the engine 3.

Next, how the computation section 39 and the control characteristic storage section 40 drive the respective flow control valves will be described with reference to FIG. 3. FIG. 3 is a table chart illustrating the connection relationship between each actuator, the hydraulic pump, and the accumulator for each operation mode of the work machine in the hydraulic drive system according to the first embodiment of the present invention.

The information shown in FIG. 3 is stored in the control characteristic storage section 40. The computation section 39 determines the operation of the work machine from the input operation amount, and determines the hydraulic system based on the information from the control characteristic storage section 40.

As shown in FIG. 3, as the operations of the work machine, there are set a single boom operation, a single arm operation, a single bucket operation, a single swing operation, an excavating operation, a swing boom raising operation, and a swing boom returning operation. The excavating operation is a combined operation of the three elements of the boom, the arm, and the bucket. The swing boom raising operation is a combined operation of the two elements of the swing body and the boom. The swing boom returning operation is a combined operation of the four elements the swing body, the boom, the arm, and the bucket for restoring the attitude of the front device to the initial attitude. FIG. 3 shows the actuators to which the first hydraulic pump 1, the second hydraulic pump 2, and the first accumulator 14 supply the hydraulic fluid at the time of these operations.

For example, FIG. 3 shows that, at the time of the single boom operation, the hydraulic fluid is supplied to the boom cylinder 4 (hereinafter it may be abbreviated to BM) from the first hydraulic pump 1, the second hydraulic pump, and the first accumulator 14. The numbers beside BM indicate the connection order in accordance with the lever operation amount. At the time of the single boom operation, the first accumulator numbered 1 is first connected to the boom cylinder 4. As the operation amount increases, the first hydraulic pump 1 numbered 2 is connected, and when the operation amount further increases, the second hydraulic pump 2 is connected.

Figure 5:
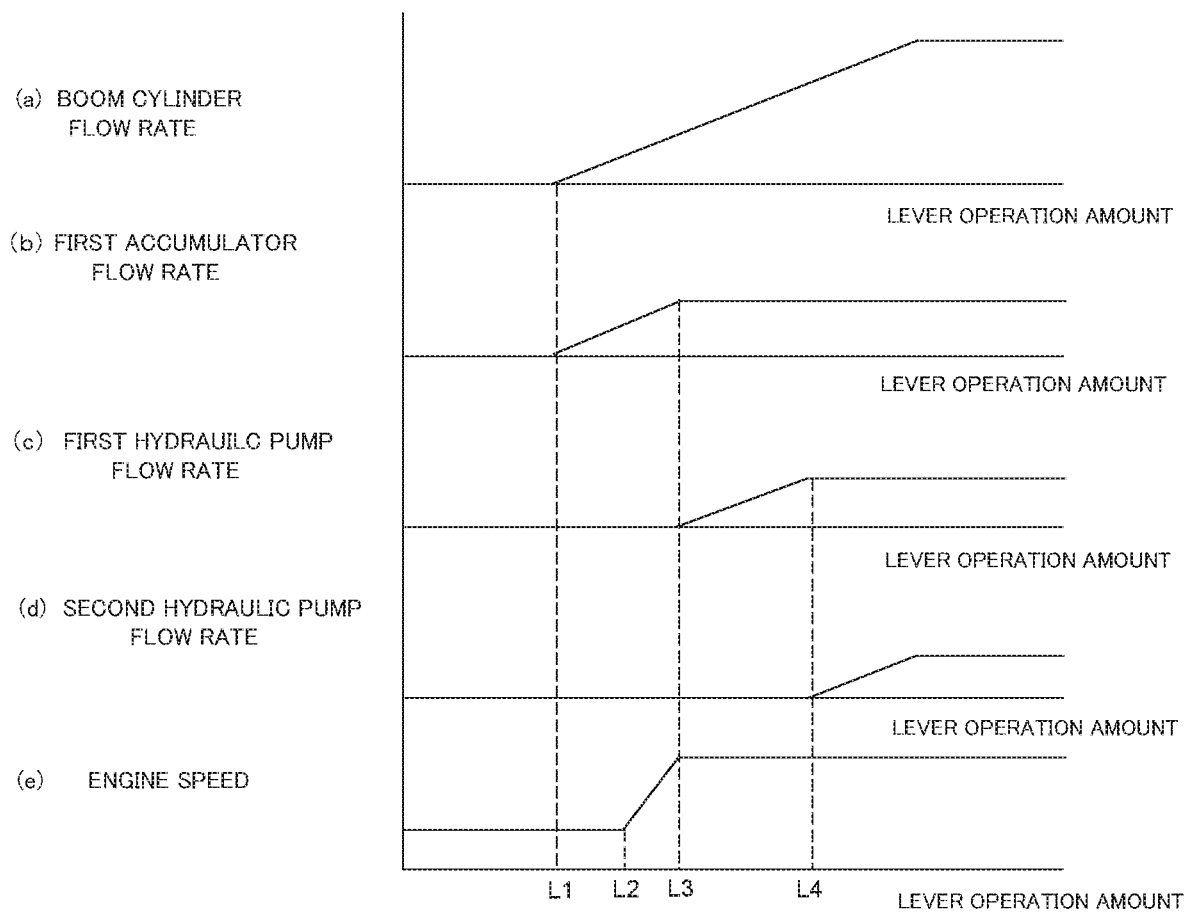
FIG. 5 is a characteristic chart illustrating the characteristics of the hydraulic fluid flow rate in the hydraulic pump and the accumulator in accordance with the lever operation amount in the hydraulic drive system of the first embodiment according to the present invention.

Next, the control in which the connection is changed in accordance with the lever operation amount will be described with reference to FIGS. 4 and 5 in connection with the single boom operation. FIG. 4 is a hydraulic circuit diagram illustrating in detail the components of a hydraulic circuit related to the boom of the hydraulic drive system according to the first embodiment of the present invention. FIG. 5 is a characteristic chart illustrating the characteristics of the hydraulic fluid flow rate in the hydraulic pump and the accumulator in accordance with the lever operation amount in the hydraulic drive system according to the first embodiment of the present invention. In FIGS. 4 and 5, the components that are the same as those of FIGS. 1 through 3 are indicated by the same reference numerals, and a detailed description thereof will be left out.

As shown in FIG. 4, the flow control valve 8 for the first hydraulic pump 1 and the boom cylinder 4 and the flow control valve 9 for the second hydraulic pump 2 and the boom cylinder 4 are 3-position-open-center directional control valves. At both ends, they are equipped with operation end portions 8a, 8b, 9a, and 9b for receiving an electromagnetic command from the controller 34. The flow control valve 8 for the first hydraulic pump 1 and the boom cylinder 4 and the flow control valve 9 for the second hydraulic pump 2 and the boom cylinder 4 switches the spool position in response to the electromagnetic command from the controller 34 to the operation end portions thereof, supplying the hydraulic fluid from the first hydraulic pump 1 and the second hydraulic pump 2 to the boom cylinder 4 to drive the boom.

The flow control valve 16 for the first hydraulic pump 1 and the first accumulator 14, the flow control valve 18 for the second hydraulic pump 2 and the first accumulator 14, the first pump flow cut control valve 35, and the second pump flow cut control valve 36 are 2-position control valves. Each of them is equipped on one side with a spring, and, on the other side, an operation end portion for receiving an electromagnetic command from the controller 34. By the command signals from the controller 34, each control valve is switch-controlled to an arbitrary position.

Further, the flow control valve 20 for the first accumulator 14 and the boom cylinder 4 is a 3-position directional control valve. It is equipped, at both ends, with operation end portions 20a and 20b for receiving an electromagnetic command from the controller 34. The flow control valve 20 for the first accumulator 14 and the boom cylinder 4 switches the spool position in response to the electromagnetic command to the operation end portions thereof from the controller 34, supplying the hydraulic fluid from the first accumulator 14 to the boom cylinder 4 to drive the boom.

The first hydraulic pump 1 and the second hydraulic pump 2 are of the variable displacement type pumps which are rotated by the engine 3 and which deliver a hydraulic working fluid having a flow rate being in proportion to the product of the engine speed and the capacity. They are respectively equipped with regulators 1a and 2a as pump flow adjustment devices. The regulators 1a and 2a are driven by command signals from the controller 34, and the tilting angle (capacity) of each hydraulic pump is controlled. Further, the engine control unit 3a provided in the engine 3 receives a command from the controller 34 to control the engine speed. These make it possible to control the delivery flow rate of each hydraulic pump.

The controller 34 outputs each of the above-mentioned command signals. Further, the controller 34 inputs the lever operation amount signal of the boom operation device 37 detected by the boom lever operation amount sensor 30, and inputs an ACCT pressure signal which is the pressure of the first accumulator 14 from the first pressure sensor 28.

Next, the operation of the system will be described with reference to FIG. 5. FIG. 5 shows the order in which the hydraulic fluid is supplied to the boom cylinder 4 in accordance with the lever operation amount. In FIG. 5, the horizontal axis indicates the lever operation amount, and the vertical axis indicates (a) the boom cylinder flow rate, (b) the first accumulator flow rate, (c) the first hydraulic pump flow rate, (d) the second hydraulic pump flow rate, and (e) the engine speed. Further, the lever operation amount increases from the left to the right. L2 is larger than L1, L3 is larger than L2, and L4 is larger than L3.

When the lever operation amount of the boom operation device 37 increases, the boom cylinder flow rate (the flow rate of the hydraulic fluid supplied to the boom cylinder 4) increases as shown in (a). This is realized as follows: when the lever operation amount becomes L1 or more, the increase in the first accumulator flow rate (the flow rate of the hydraulic fluid supplied from the accumulator 14 to the boom cylinder 4) is started. When the lever operation amount becomes L3 or more, the increase in the first hydraulic pump flow rate (the flow rate of the hydraulic fluid supplied to the boom cylinder 4 from the first hydraulic pump 1) is started. When the lever operation amount becomes L4 or more, the increase in the second hydraulic pump flow rate (the flow rate of the hydraulic fluid supplied to the boom cylinder 4 from the second hydraulic pump 2) is started.

The engine speed shown in (e) is controlled to a low engine speed in a region where the lever operation amount is small (less than L2). The engine speed is started to increase at a point where the lever operation amount is L2 or more, and is controlled to reach a predetermined high engine speed when the lever operation amount attains L3. In this way, in the lever operation amount region (less than L3) where the hydraulic fluid is supplied solely from the first accumulator 14, the engine speed is reduced or stopped, whereby it is possible to attain a further reduction in fuel consumption.

More specifically, in the hydraulic circuit shown in FIG. 4, in order to increase the first accumulator flow rate, the controller 34 outputs an electromagnetic command to the operation end portion 20a of the flow control valve 20 for the first accumulator 14 and the boom cylinder 4, and switches the spool position, whereby it supplies the hydraulic fluid from the first accumulator 14 to the boom cylinder 4.

Further, when the lever operation amount increases to become L3 or more, the controller 43 outputs a command signal to the regulator 1a, and increases the tilting angle of the first hydraulic pump 1 to raise the flow rate. At the same time, it outputs an electromagnetic command to the operation end portion 8a of the flow control valve 8 for the first hydraulic pump 1 and the boom cylinder 4 to switch the spool position, thereby supplying the hydraulic fluid from the first hydraulic pump 1 to the boom cylinder 4.

When the lever operation amount becomes L4 or more, the controller 43 outputs a command signal to the regulator 2a, and increases the tilting angle of the second hydraulic pump 2. At the same time, it outputs an electromagnetic command to the operation end portion 9a of the flow control valve 9 for the second hydraulic pump 2 and the boom cylinder 4 to switch the spool position, thereby supplying the hydraulic fluid from the second hydraulic pump 2 to the boom cylinder 4.

In the present embodiment, in the range where the lever operation amount is small, solely the first accumulator flow rate is supplied to the boom cylinder 4, so that the output power of the first hydraulic pump 1 and of the second hydraulic pump 2 is suppressed, and it is possible to achieve a reduction in fuel consumption. As the lever operation amount increases, the hydraulic fluid is supplied from the first hydraulic pump 1 and the second hydraulic pump 2, so that when a great flow rate is required in the boom cylinder 4, the hydraulic fluid is supplied directly from the hydraulic pumps. As a result, it is possible to suppress the energy loss due to the temporary accumulation of the hydraulic fluid from the hydraulic pumps in the accumulator, making it possible to supply the hydraulic fluid more efficiently. When, in such a great flow rate range, the first accumulator flow rate is controlled to be reduced or reduced to 0, it is possible to achieve a further improvement in terms of efficiency.

When, in the hydraulic circuit shown in FIG. 4, the pressure of the first accumulator 14 is reduced, the controller 34 outputs, in the case where the first hydraulic pump 1 is supplying the hydraulic fluid, an electromagnetic command to the operation end portion of the flow control valve 16 for the first hydraulic pump 1 and the first accumulator 14 to cause an opening operation, and outputs an electromagnetic command to the operation end portion of the first pump flow cut control valve 35 to cause a closing operation. In the case where the second hydraulic pump 2 is supplying the hydraulic fluid, it outputs an electromagnetic command to the operation end portion of the flow control valve 18 for the second hydraulic pump 2 and the first accumulator 14 to cause an opening operation, and outputs an electromagnetic command to the operation end portion of the second pump flow cut control valve 36 to cause a closing operation. As a result, it is possible to send the hydraulic fluid of the first hydraulic pump 1 or the second hydraulic pump 2 into the first accumulator 14 for charging (accumulation). The condition of the first accumulator 14 can be judged by the signal from the first pressure sensor 28.

There has been described a connection change control of the hydraulic pump or the accumulator in accordance with the lever operation amount in the single boom operation. This control is also executed in each of the single operations of the arm, bucket, and swinging. In this case, the lever operation amounts are detected by an arm lever operation amount sensor 31, a bucket lever operation amount sensor 32, a swing lever operation amount sensor 33, etc.

As shown in FIGS. 3 and 4, in the case of the single arm operation, the controller 34 respectively controls a flow control valve 10 for the first hydraulic pump 1 and the arm cylinder 5, a flow control valve 11 for the second hydraulic pump 2 and the arm cylinder 5, and a flow control valve 22 for the first accumulator 14 and the arm cylinder 5 in order to supply the hydraulic fluid to the arm cylinder 5 from each of the first hydraulic pump 1, the second hydraulic pump 2, and the first accumulator 14.

In the case of the single bucket operation, the controller 34 controls the flow control valve 12 for the first hydraulic pump 1 and the bucket cylinder 6 in order to supply the hydraulic fluid from the first hydraulic pump 1 to the bucket cylinder 6, and controls the flow control valve 24 for the first accumulator 14 and the bucket cylinder 6 in order to supply the hydraulic fluid from the first accumulator 14 to the arm cylinder 5.

Similarly, in the case of the single swing operation, the controller 34 controls the flow control valve 13 for the second hydraulic pump 2 and the swing motor 7 in order to supply the hydraulic fluid from the second hydraulic pump 2 to the swing motor 7, and controls the flow control valve 26 for the first accumulator 14 and the swing motor 7 in order to supply the hydraulic fluid from the first accumulator 14 to the swing motor 7.

Further, in the case of the single bucket operation or the single swing operation, the requisite flow rate of the hydraulic fluid for the driving is low, so that the supply from one hydraulic pump suffices. Thus, it is possible to charge the first accumulator 14 (accumulate the hydraulic fluid) from one of the first hydraulic pump 1 and the second hydraulic pump 2 via the flow control valve 16 for the first hydraulic pump 1 and the first accumulator 14 or the flow control valve 18 for the second hydraulic pump 2 and the first accumulator 14. When performing the charging, the controller 34 drives the first pump flow cut control valve 35 and the second pump flow cut control valve 36 to prevent inflow of the hydraulic fluid of the first hydraulic pump 1 and the second hydraulic pump 2 into the tank, performing control such that the hydraulic fluid flows into the first accumulator 14.

Figure 6:
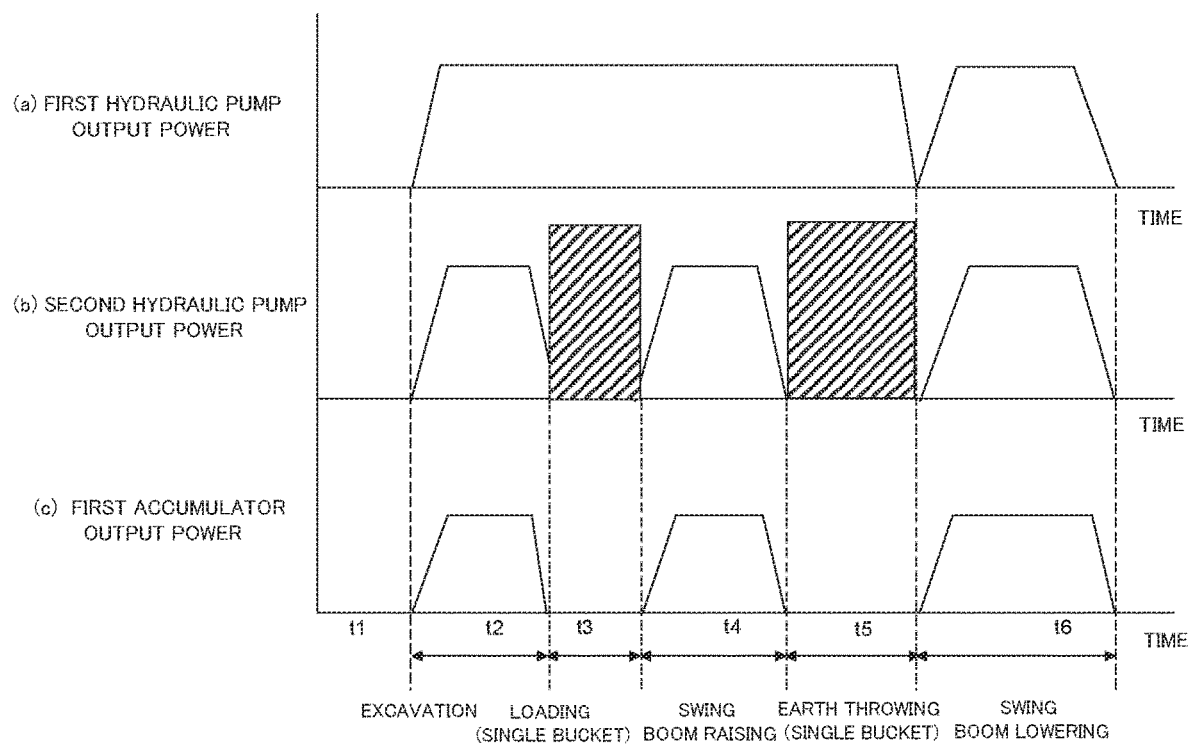
FIG. 6 is a characteristic chart illustrating the output power characteristics of the hydraulic pump and the accumulator at the time of a combined operation in the hydraulic drive system according to the first embodiment of the present invention.

Next, the output power of the hydraulic pump and the accumulator in the case of a combined operation such as excavating, a swing boom raising, or a swing boom returning shown in FIG. 3 will be described with reference to FIG. 6. FIG. 6 is a characteristic chart illustrating the output power characteristics of the hydraulic pump and the accumulator at the time of a combined operation in the hydraulic drive system according to the first embodiment of the present invention. Here, the term "output power" means what is obtained as the product of the pressure and the flow rate.

In the controller 34, the actuator to which the hydraulic fluid is to be supplied and the hydraulic pump or the accumulator from which the hydraulic fluid is supplied at the time of a combined operation are previously set. For example, in a 3-element combined operation of the boom, the arm, and the bucket as in the case of excavating, the hydraulic fluid supply is assigned such that the hydraulic fluid is supplied from the first hydraulic pump 1 to the bucket cylinder 6, from the second hydraulic pump 2 to the arm cylinder 5, and from the first accumulator 14 to the boom cylinder 4. Due to this arrangement, it is possible to mitigate the diversion loss in the case where the supply is made from one hydraulic pump to a plurality of actuators, making it possible to reduce the fuel consumption. The combined operation is determined by each lever operation amount signal detected by a boom lever operation amount sensor 30, an arm lever operation amount sensor 31, a bucket lever operation amount sensor 32, a swing lever operation amount sensor 33, etc.

FIG. 6 schematically illustrates the output power characteristics of the hydraulic excavator at the time of excavating/loading operation. In this situation, the hydraulic excavator excavates earth and gravel, and loads dump truck at standby by the side of the hydraulic excavator with the earth and sand, with each output power at this operation being shown. In FIG. 6, the horizontal axis indicates time, and the vertical axis indicates (a) the first hydraulic pump output power, (b) the second hydraulic pump output power, and (c) the first accumulator output power. The reference sign t1 indicates the point in time at which excavation is started. The reference sign t2 indicates the point in time at which the excavation is completed, and at which the loading is started. The reference sign t3 indicates the point in time at which the swing boom raising is started. The reference sign t4 indicates the point in time at which the swing boom raising is completed and at which the earth throwing is started. The reference sign t5 indicates the point in time at which the swing boom lowering is started. The reference sign t6 indicates the point in time at which the swing boom lowering is completed.

In the excavating operation from time t1 to t2, the hydraulic fluid is supplied from the first hydraulic pump 1, the second hydraulic pump 2, and the first accumulator to the bucket cylinder 6, the arm cylinder 5, and the boom cylinder 4, respectively.

In the single bucket operation for the loading from time t2, the hydraulic fluid is supplied to the bucket cylinder 6 from the first hydraulic pump 1, whereas there is no need to supply the hydraulic fluid to anywhere from the second hydraulic pump 2. Thus, when such an operation is being performed, and in the case where the pressure of the first accumulator 14 detected by the first pressure sensor 28 is low, it is possible to supply the hydraulic fluid to the first accumulator 14 from the second hydraulic pump 2 for charging as indicated by the shaded portion in (b).

In the swing boom raising operation from the time t3, the hydraulic fluid is supplied to the boom cylinder 4 from the first hydraulic pump 1 and the first accumulator 14, and the hydraulic fluid is supplied to the swing motor 7 from the second hydraulic pump 2.

In the single bucket operation for the earth throwing from the time t4, the hydraulic fluid is supplied to the bucket cylinder 6 from the first hydraulic pump 1 as in the case of the single bucket operation at the time of loading, and the second hydraulic pump 2 supplies the hydraulic fluid to the first accumulator 14 as needed.

In the swing boom lowering operation from the time t5, the hydraulic fluid is supplied from the first hydraulic pump 1 to the bucket cylinder 6 and the boom cylinder 4, from the second hydraulic pump 2 to the swing motor 7, and from the first accumulator 14 to the arm cylinder 5.

In the above-described combined operation, attention will be focused on the boom cylinder 4, the arm cylinder 5, the boom lever operation amount, and the arm lever operation amount. Then, the controller 34 is controlling at least one of the flow control valve 8 for the first hydraulic pump and the boom cylinder 4, the flow control valve 20 for the first accumulator 14 and the boom cylinder 4, the flow control valve 10 for the first hydraulic pump 1 and the arm cylinder 5, and the flow control valve 22 for the first accumulator 14 and the arm cylinder 5 in accordance with at least one of the operation amount detected by the boom lever operation amount sensor 30 and the operation amount detected by the arm lever operation amount sensor 31.

In this way, each of the connection destinations of the hydraulic pumps and the accumulator are allotted to each of the actuators, whereby it is possible to reduce the diversion loss generated in the case where the hydraulic fluid is supplied from one hydraulic pump to a plurality of actuators, so that it is possible to reduce the fuel consumption.

Due to the above configuration, it is possible to determine, from the lever operation amount and the operation, whether to supply the hydraulic fluid from the accumulator to the actuator, or to supply the hydraulic fluid directly from the hydraulic pump to the actuator via the control valve, and to control the hydraulic pump flow rate and the accumulator flow rate in an optimum fashion, whereby it is possible to achieve a substantial fuel consumption reducing effect.

In the hydraulic drive system according to the first embodiment of the present invention, there are provided one circuit supplying the hydraulic fluid directly from the hydraulic pump to the hydraulic cylinder via one valve, and another circuit supplying the hydraulic fluid accumulated in an accumulator to the hydraulic cylinder via another valve, making it possible to supply the hydraulic fluid from more efficient one of the circuits to the hydraulic cylinder in accordance with the operation, so that it is possible to achieve a substantial improvement in terms of efficiency for the work machine as a whole and to achieve a large reduction in fuel consumption.

Embodiment 2

Figure 7:
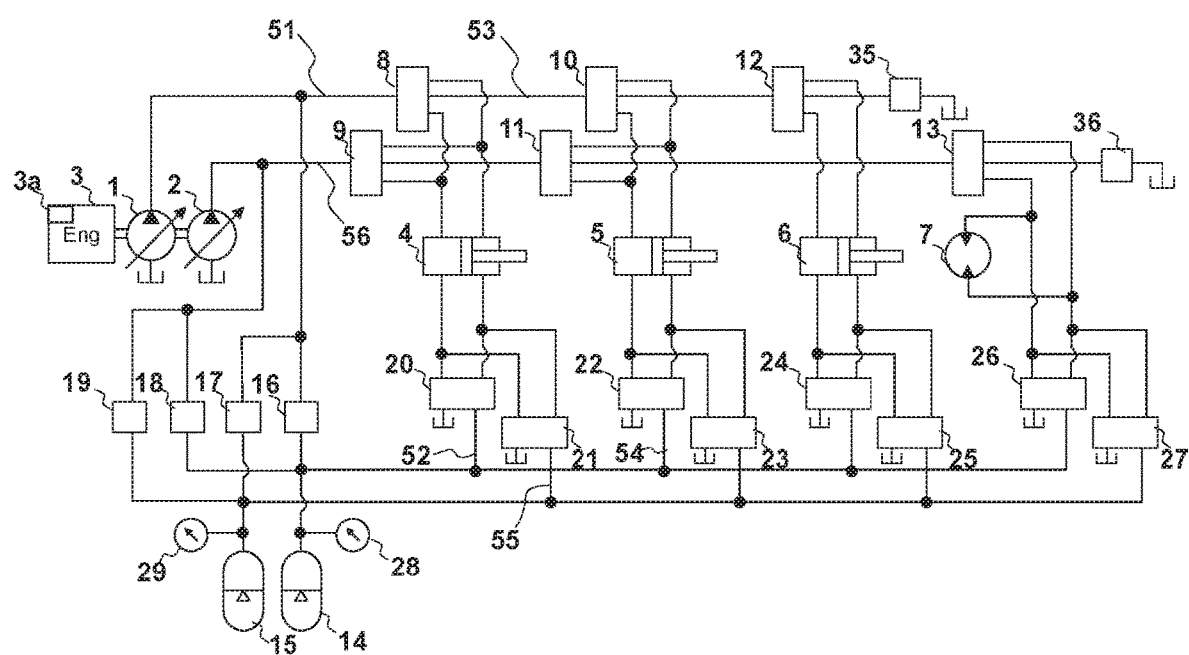
FIG. 7 is a conceptual drawing illustrating a hydraulic circuit in a hydraulic drive system according to a second embodiment of the present invention.
Figure 8:
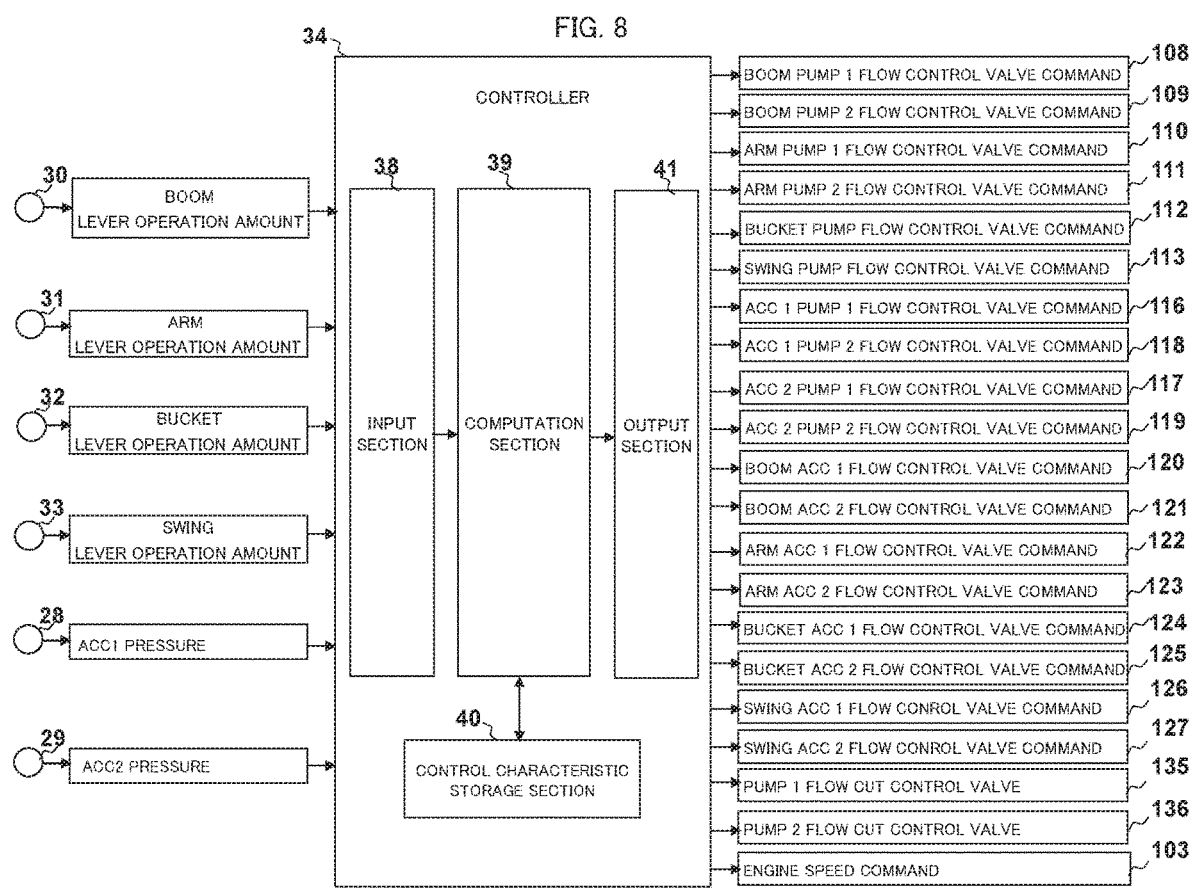
FIG. 8 is a conceptual drawing illustrating an outline of a controller constituting the hydraulic drive system according to the second embodiment of the present invention.

In the following, the hydraulic drive system according to the second embodiment of the present invention will be described with reference to the drawings. FIG. 7 is a conceptual drawing illustrating a hydraulic circuit in a hydraulic drive system according to the second embodiment of the present invention. FIG. 8 is a conceptual drawing illustrating an outline of a controller constituting the hydraulic drive system according to the second embodiment of the present invention. FIG. 9 is a table chart illustrating the connection relationship between each actuator, a hydraulic pump, and an accumulator for each operation mode of a work machine in the hydraulic drive system according to the second embodiment of the present invention. In FIGS. 7 through 9, the components that are the same as those of FIGS. 1 through 6 are indicated by the same reference numerals, and a detailed description thereof will be left out.

As shown in FIG. 7, in the hydraulic drive system according to the second embodiment of the present invention, a second accumulator 15 is added, and control valves, etc. for the actuators are added accordingly. More specifically, the first and the second hydraulic pump 1, 2 and the second accumulator 15 are connected by lines. In the line connecting the first hydraulic pump 1 and the second accumulator 15, there is provided a flow control valve 17 for the first hydraulic pump 1 and the second accumulator 15 as the second accumulation flow adjustment device configured to control the flow rate of the hydraulic fluid to be supplied from the first hydraulic pump 1 to the second accumulator 15, and, in the line connecting the second hydraulic pump 2 and the second accumulator 15, there is provided a flow control valve 19 for the second hydraulic pump 2 and the second accumulator 15 as the fourth accumulation flow adjustment device configured to control the flow rate of the hydraulic fluid to be supplied from the second hydraulic pump 2 to the second accumulator 15.

Further, the second accumulator 15 and the actuators are connected to each other by respective lines. In a line 55 as the fifth line connecting the second accumulator 15 and the boom cylinder 4, there is provided a flow control valve 21 for the second accumulator 15 and the boom cylinder 4 as the third accumulation flow supply device configured to control the flow rate of the hydraulic fluid to be supplied from the second accumulator 15 to the boom cylinder 4. In the line connecting the second accumulator 15 and the arm cylinder 5, there is provided a flow control valve 23 for the second accumulator 15 and the arm cylinder 5 which is configured to control the flow rate of the hydraulic fluid to be supplied to the arm cylinder 5 from the second accumulator 15.

Similarly, in the line connecting the second accumulator 15 and the bucket cylinder 6, there is provided a flow control valve 25 for the second accumulator 15 and the bucket cylinder 6 which is configured to control the flow rate of the hydraulic fluid to be supplied to the bucket cylinder 6 from the second accumulator 15. In the line connecting the second accumulator 15 and the swing motor 7, there is provided a flow control valve 27 for the second accumulator 15 and the swing motor 7 which is configured to control the flow rate of the hydraulic fluid to be supplied to the swing motor 7 from the second accumulator 15.

Further, in the line into which the hydraulic fluid is delivered from the second accumulator 15, there is provided a second pressure sensor 29 for detecting the pressure of the second accumulator 15. Each of the above-mentioned control valves 17, 19, 21, 23, 25, and 27 is driven by a command signal from the controller 34, and controls the flow rate, etc. through a change in the position of a spool therein.

In the present embodiment, the set pressures of the first accumulator 14 and the second accumulator 15 are of different values, whereby it is possible to supply the hydraulic fluid from the accumulator the pressure of which is close to that of the actuator in accordance with the operation of the work machine. This helps to reduce the pressure loss between the accumulator and the actuator, so that it is possible to achieve a further reduction in fuel consumption.

The controller 34 of the present embodiment differs from that of the first embodiment in that an ACC2 pressure 129 signal which is the pressure of the second accumulator 15 detected by the second pressure sensor 29 is input to the input section 38, and that the control commands for controlling the added flow control valves 17, 19, 21, 23, 25, and 27 are computed, with control valve commands 117, 119, 121, 123, 125, and 127 for controlling the flow control valves being output from the output section 41.

Next, the operation of the controller according to the present embodiment will be described with reference to FIG. 9. As compared with the first embodiment shown in FIG. 3, in the present embodiment, the second accumulator 15 is added, so that the allotment of the hydraulic pumps and the first accumulator at the time of each operation is changed. In the present embodiment, the set pressure of the first accumulator 14 is a high pressure (HP), and the pressure of the second accumulator 15 is set to a medium pressure (MP).

In this way, the set pressures of the first accumulator 14 and the second accumulator 15 are of different values, so that in the case of a high load operation like the single boom operation and the single swing operation, it is possible to supply the hydraulic fluid from the first accumulator 14, and, in the case of a low load operation like the single arm operation and the single bucket operation, it is possible to supply the hydraulic fluid from the second accumulator. As a result, it is possible to further reduce the pressure loss between the accumulators and the actuators, and to achieve a reduction in fuel consumption.

In the case of the single bucket operation and the single swing operation shown FIG. 9, a single hydraulic pump suffices as the hydraulic pump supplying the hydraulic fluid, so that the other hydraulic pump can be used to charge the accumulator as needed. In the present embodiment, when the pressure of the second accumulator 15 is lowered, the controller 34 takes the signal of the second pressure sensor 29 in, and outputs an electromagnetic command to the operation end portion of the flow control valve 17 for the first hydraulic pump 1 and the second accumulator 15 to cause an opening operation if the first hydraulic pump 1 is supplying the hydraulic fluid. If the second hydraulic pump 2 is supplying the hydraulic fluid, the controller outputs an electromagnetic command to the operation end portion of the flow control valve 19 for the second hydraulic pump 2 and the second accumulator 15 to cause an opening operation. As a result, it is possible to send the hydraulic fluid of the first hydraulic pump 1 or the second hydraulic pump 2 to the second accumulator 15 for charging (accumulation).

The swing boom return operation is a 4-element-combined operation in which, in addition to the swing and the boom, the arm and the bucket are operated in order to restore the attitude of the front device to the initial attitude. In the present embodiment, the second accumulator 15 is added, so that it is possible to supply the hydraulic fluid to each of the actuators from each of the hydraulic pumps and the accumulators without diversion. As a result, it is possible to mitigate the diversion loss generated in the case where the hydraulic fluid is supplied from one hydraulic pump to a plurality of actuators, making it possible to achieve a reduction in fuel consumption.

In this way, there are provided two accumulators, whereby it is possible to supply the actuator with the hydraulic fluid from the accumulator the pressure of which is close to that of the actuator in accordance with the operation of the work machine. As a result, it is possible to mitigate the pressure loss between the accumulator and the actuator, making it possible to achieve a further reduction in fuel consumption. Further, it is possible to mitigate the diversion loss generated in the case where the hydraulic fluid is supplied from one hydraulic pump to a plurality of actuators, so that it is possible to achieve a reduction in fuel consumption.

In the hydraulic drive system of the second embodiment of the present invention described above, it is possible to attain the same effect as that of the first embodiment described above.

Further, in the hydraulic drive system according to the second embodiment of the present invention described above, it is possible to further mitigate the diversion loss generated in the case where the hydraulic fluid is supplied from one hydraulic pump to a plurality of actuators, so that it is possible to achieve a further reduction in fuel consumption.

While in the second embodiment described above two accumulators are provided, this should not be construed restrictively. The number of accumulators may also be, for example, three or four. In this case, the pressures of the accumulators are set to different ranges, whereby it is possible to select as a connection destination an accumulator involving less difference in pressure between the actuators and the accumulators, so that it is possible to further mitigate the pressure loss and to achieve a further improvement in terms of fuel efficiency performance.

DESCRIPTION OF REFERENCE CHARACTERS

1: First hydraulic pump
2: Second hydraulic pump
3: Engine
3a: Engine control unit (prime mover controller)
4: Boom cylinder (first hydraulic actuator)
5: Arm cylinder (second hydraulic actuator)
6: Bucket cylinder
7: Swing motor
8: Flow control valve for the first hydraulic pump 1 and the boom cylinder 4 (first pump flow adjustment device)
9: Flow control valve for the second hydraulic pump 2 and the boom cylinder 4 (third pump flow adjustment device)
10: Flow control valve for the first hydraulic pump 1 and the arm cylinder 5 (second pump flow adjustment device)
11: Flow control valve for the second hydraulic pump 2 and the arm cylinder 5
12: Flow control valve for the first hydraulic pump 1 and the bucket cylinder 6
13: Flow control valve for the second hydraulic pump 2 and the swing motor 7
14: First accumulator
15: Second accumulator
16: Flow control valve for the first hydraulic pump 1 and the first accumulator 14 (first accumulation flow adjustment device)
17: Flow control valve for the first hydraulic pump 1 and the second accumulator 15 (second accumulation flow adjustment device)
18: Flow control valve for the second hydraulic pump 1 and the first accumulator 14 (third accumulation flow adjustment device)
19: Flow control valve for the second hydraulic pump 2 and the second accumulator 15 (fourth accumulation flow adjustment device)
20: Flow control valve for the first accumulator 14 and the boom cylinder 4 (first accumulation flow supply device)
21: Flow control valve for the second accumulator 15 and the boom cylinder 4 (third accumulation flow supply device)
22: Flow control valve for the first accumulator 14 and the arm cylinder 5 (second accumulation flow supply device)
23: Flow control valve for the second accumulator 15 and the arm cylinder 5

24: Flow control valve for the first accumulator 14 and the boom cylinder 4
25: Flow control valve for the second accumulator 15 and the bucket cylinder 6
26: Flow control valve for the first accumulator 14 and the swing motor 7
27: Flow control valve for the second accumulator 15 and the swing motor 7
28: First pressure sensor
29: Second pressure sensor
30: Boom lever operation amount sensor (first operation amount sensor)
31: Arm lever operation amount sensor (second operation amount sensor)
32: Bucket lever operation amount sensor
33: Swing lever operation amount sensor
34: Controller
35: First pump flow cut control valve (pump flow cut device)
36: Second pump flow cut control valve
37: Boom operation device
38: Input section
39: Computation section
40: Control characteristic storage section
41: Output section
51: Line (first line)
52: Line (second line)
53: Line (third line)
54: Line (fourth line)
55: Line (fifth line)
56: Line (sixth line)

The invention claimed is:

1. A hydraulic drive system comprising:
a first hydraulic pump;
a first hydraulic actuator driven by being supplied with a hydraulic fluid from the first hydraulic pump;
a first line for supplying the hydraulic fluid from the first hydraulic pump to the first hydraulic actuator;
a first pump flow adjustment device installed in the first line, the first pump flow adjustment device being configured to adjust a flow of the hydraulic fluid from the first hydraulic pump to the first hydraulic actuator;
a first hydraulic accumulator for accumulating the hydraulic fluid delivered from the first hydraulic pump;
a first accumulation flow adjustment device configured to adjust the flow of the hydraulic fluid from the first hydraulic pump to the first hydraulic accumulator;
a first accumulation flow supply device configured to supply the hydraulic fluid accumulated in the first hydraulic accumulator to the first hydraulic actuator via a second line different from the first line;
a first operation amount sensor for detecting an operation amount of an operation device of the first hydraulic actuator; and
a controller to which the operation amount detected by the first operation amount sensor is input, the controller being configured to control the first pump flow adjustment device and the first accumulation flow supply device,
wherein the controller controls at least one of the first pump flow adjustment device and the first accumulation flow supply device in accordance with the operation amount detected by the first operation amount sensor, characterized in that the hydraulic drive system further comprises:
a second hydraulic actuator driven by being supplied with the hydraulic fluid from the first hydraulic pump;
a third line for supplying the hydraulic fluid from the first hydraulic pump to the second hydraulic actuator;
a second pump flow adjustment device installed in the third line, the second pump flow adjustment device being configured to adjust the flow of the hydraulic fluid from the first hydraulic pump to the second hydraulic actuator; and
a second accumulation flow supply device configured to supply the hydraulic fluid accumulated in the first hydraulic accumulator to the second hydraulic actuator via a fourth line different from the third line.

2. The hydraulic drive system according to claim 1, further comprising:
a second operation amount sensor for detecting an operation amount of an operation device of the second hydraulic actuator,
wherein the controller controls at least one of the first pump flow adjustment device, the first accumulation flow supply device, the second pump flow adjustment device, and the second accumulation flow supply device in accordance with at least one of the operation amounts detected by the first operation amount sensor and the second operation amount sensor.

3. The hydraulic drive system according to claim 1, further comprising:
a prime mover for driving the first hydraulic pump; and
a prime mover controller for controlling the engine speed of the prime mover,
wherein the controller is configured to:
control the first accumulation flow supply device to supply the hydraulic fluid to the first hydraulic actuator when the operation amount detected by the first operation amount sensor is equal to or greater than a first threshold value;
output a command to the prime mover controller so as to increase the engine speed of the prime mover when the operation amount detected by the first operation amount sensor is equal to or greater than a second threshold value larger than the first threshold value; and
cause the first pump flow adjustment device to supply the hydraulic fluid to the first hydraulic actuator when the operation amount detected by the first operation amount sensor is equal to or greater than a third threshold value larger than the second threshold value.

4. The hydraulic drive system according to claim 3, wherein
the first pump flow adjustment device is an open center type control valve that discharges the hydraulic fluid from the first hydraulic pump to a tank when no hydraulic fluid is supplied to the first hydraulic actuator, and
the hydraulic drive system comprises a pump flow cut device for adjusting the flow rate or pressure from the first hydraulic pump to the tank.

5. The hydraulic drive system according to claim 1, wherein
the first pump flow adjustment device is an open center type control valve that discharges the hydraulic fluid from the first hydraulic pump to a tank when no hydraulic fluid is supplied to the first hydraulic actuator, and
the hydraulic drive system comprises a pump flow cut device for adjusting the flow rate or pressure from the first hydraulic pump to the tank.

6. A hydraulic drive system comprising:
a first hydraulic pump;
a first hydraulic actuator driven by being supplied with a hydraulic fluid from the first hydraulic pump;
a first line for supplying the hydraulic fluid from the first hydraulic pump to the first hydraulic actuator;
a first pump flow adjustment device installed in the first line, the first pump flow adjustment device being configured to adjust a flow of the hydraulic fluid from the first hydraulic pump to the first hydraulic actuator;
a first hydraulic accumulator for accumulating the hydraulic fluid delivered from the first hydraulic pump;
a first accumulation flow adjustment device configured to adjust the flow of the hydraulic fluid from the first hydraulic pump to the first hydraulic accumulator; and
a first accumulation flow supply device configured to supply the hydraulic fluid accumulated in the first hydraulic accumulator to the first hydraulic actuator via a second line different from the first line, characterized in that
the hydraulic drive system further comprises:
a second hydraulic accumulator for accumulating the hydraulic fluid from the first hydraulic pump; and
a second accumulation flow adjustment device configured to adjust the flow of the hydraulic fluid from the first hydraulic pump to the second hydraulic accumulator,
wherein the hydraulic drive system further comprises a third accumulation flow supply device configured to supply the hydraulic fluid accumulated in the second hydraulic accumulator to the first hydraulic actuator via a fifth line different from the first line and the second line.

7. The hydraulic drive system according to claim 6, wherein
the first pump flow adjustment device is an open center type control valve that discharges the hydraulic fluid from the first hydraulic pump to a tank when no hydraulic fluid is supplied to the first hydraulic actuator, and
the hydraulic drive system comprises a pump flow cut device for adjusting the flow rate or pressure from the first hydraulic pump to the tank.

8. A hydraulic drive system comprising:
a first hydraulic pump;
a first hydraulic actuator driven by being supplied with a hydraulic fluid from the first hydraulic pump;
a first line for supplying the hydraulic fluid from the first hydraulic pump to the first hydraulic actuator;
a first pump flow adjustment device installed in the first line, the first pump flow adjustment device being configured to adjust a flow of the hydraulic fluid from the first hydraulic pump to the first hydraulic actuator;
a first hydraulic accumulator for accumulating the hydraulic fluid delivered from the first hydraulic pump;
a first accumulation flow adjustment device configured to adjust the flow of the hydraulic fluid from the first hydraulic pump to the first hydraulic accumulator; and
a first accumulation flow supply device configured to supply the hydraulic fluid accumulated in the first hydraulic accumulator to the first hydraulic actuator via a second line different from the first line, characterized in that
the hydraulic drive system further comprises:
a second hydraulic pump;
a sixth line for supplying the hydraulic fluid from the second hydraulic pump to the first hydraulic actuator;
a third pump flow adjustment device installed in the sixth line, third pump flow adjustment device being configured to adjust the flow of the hydraulic fluid from the second hydraulic pump to the first hydraulic actuator; and
a third accumulation flow adjustment device configured to adjust the flow of the hydraulic fluid from the second hydraulic pump to the first hydraulic accumulator.

9. The hydraulic drive system according to claim 8, further comprising:
a second hydraulic accumulator for accumulating the hydraulic fluid delivered from the first hydraulic pump and the second hydraulic pump;
a second accumulation flow adjustment device configured to adjust the flow of the hydraulic fluid from the first hydraulic pump to the second hydraulic accumulator; and
a fourth accumulation flow adjustment device configured to adjust the flow of the hydraulic fluid from the second hydraulic pump to the second hydraulic accumulator,
wherein the hydraulic drive system further comprises a third accumulation flow supply device configured to supply the hydraulic fluid accumulated in the second hydraulic accumulator to the first hydraulic actuator via a fifth line different from the first line and the second line.

10. The hydraulic drive system according to claim 8, wherein
the first pump flow adjustment device is an open center type control valve that discharges the hydraulic fluid from the first hydraulic pump to a tank when no hydraulic fluid is supplied to the first hydraulic actuator, and
the hydraulic drive system comprises a pump flow cut device for adjusting the flow rate or pressure from the first hydraulic pump to the tank.

* * * * *